US 8,060,447 B2

(12) United States Patent
Hamid et al.

(10) Patent No.: US 8,060,447 B2
(45) Date of Patent: Nov. 15, 2011

(54) METHOD OF PROVIDING TRANSACTIONS EMPLOYING ADVERTISING BASED VERIFICATION

(75) Inventors: Laurence Hamid, Ottawa (CA); Darren Krahn, Kanata (CA)

(73) Assignee: Imation Corp., Oakdale, MN (US)

( * ) Notice: Subject to any disclaimer, the term of this patent is extended or adjusted under 35 U.S.C. 154(b) by 163 days.

(21) Appl. No.: 12/404,475

(22) Filed: Mar. 16, 2009

(65) Prior Publication Data

US 2009/0235081 A1    Sep. 17, 2009

Related U.S. Application Data

(63) Continuation-in-part of application No. 12/186,734, filed on Aug. 6, 2008.

(60) Provisional application No. 61/064,619, filed on Mar. 17, 2008, provisional application No. 60/935,347, filed on Aug. 8, 2007.

(51) Int. Cl.
*G06K 19/06* (2006.01)
*G06T 1/00* (2006.01)

(52) U.S. Cl. .............................. 705/64; 705/50; 713/176

(58) Field of Classification Search ................ 705/50–51
See application file for complete search history.

(56) References Cited

U.S. PATENT DOCUMENTS

| | | | |
|---|---|---|---|
| 5,778,071 A | 7/1998 | Caputo et al. | |
| 5,917,913 A | 6/1999 | Wang | |
| 6,018,724 A * | 1/2000 | Arent | 705/44 |
| 6,983,057 B1 * | 1/2006 | Ho et al. | 382/100 |
| 7,113,615 B2 * | 9/2006 | Rhoads et al. | 382/100 |
| 7,216,237 B2 * | 5/2007 | Vanstone | 713/184 |
| 7,552,333 B2 * | 6/2009 | Wheeler et al. | 713/176 |
| 7,706,565 B2 * | 4/2010 | Levy et al. | 382/100 |
| 7,757,089 B2 * | 7/2010 | Kusuda et al. | 713/176 |
| 2001/0056410 A1 * | 12/2001 | Ishigaki | 705/67 |
| 2003/0231785 A1 * | 12/2003 | Rhoads et al. | 382/100 |
| 2005/0078851 A1 * | 4/2005 | Jones et al. | 382/100 |
| 2005/0144063 A1 * | 6/2005 | Spector | 705/14 |
| 2006/0080538 A1 * | 4/2006 | Kusuda et al. | 713/176 |
| 2006/0287963 A1 * | 12/2006 | Steeves et al. | 705/64 |
| 2008/0098464 A1 * | 4/2008 | Mizrah | 726/5 |

FOREIGN PATENT DOCUMENTS

WO    WO2006/091368    *    8/2006

OTHER PUBLICATIONS

Soriente et al. ("HAPADEP: Human-Assisted Pure Audio Device Pairing", Computer Science Department, University of California Irvine, 2008, 16 pages).*

* cited by examiner

*Primary Examiner* — Calvin L Hewitt, II
*Assistant Examiner* — James D Nigh
(74) *Attorney, Agent, or Firm* — Freedman & Associates

(57) ABSTRACT

A method of improving electronic security establishes a secure trusted path between a user and an institution seeking an electronic signature to verify a transaction before any request for signature and completing electronic transaction activities occurs. The secure trusted path providing the user with a first predetermined portion of a branded watermark, for instance an advertisement, provided from the institution in conjunction with the request, and a second predetermined portion of the branded watermark being provided upon a personalized device that cannot be intercepted or manipulated by malware, allowing the user to verify that the request as displayed upon the user's primary computing device is valid.

10 Claims, 3 Drawing Sheets

METHOD OF PROVIDING TRANSACTIONS EMPLOYING ADVERTISING BASED VERIFICATION

FIELD OF THE INVENTION

The invention relates to providing assured transactions and more particularly to establishing trusted communication paths including verification based upon embedded advertising data.

BACKGROUND OF THE INVENTION

In recent years electronic commerce (e-commerce) has been the focus of significant attention, as Internet-related sales have grown at rates of 25 percent or more. Despite this, in 2006 overall online sales within the US excluding travel purchases represented only about 6 percent of US retail sales. In 2007, including travel, this figure is expected to increase 18 percent to approximately US$260 billion.

A prevalent trend is for consumers to use the Internet as a product research tool. Hence, at present retailers who effectively build bridges between their stores and web sites stand to be the big winners in the "research-online/buy-in-store era." Hampering e-commerce, and therefore it's growth, is the perception that e-commerce has many privacy and security issues, of which a central aspect is that there is no reliable way to ensure that the sender of an electronic transmission is in fact who they purport to be. The non-physical nature of the Internet renders traditional methods of physically marking media with a seal or signature, for various business, commerce, and legal purposes, not practical. Rather, some mark must be coded into the information itself in order to identify the source and authenticate the contents.

In commerce, whether online or face-to-face, the client and the merchant must provide identification, authentication and authorization. Identification is the process that enables recognition of a user described to an automated data processing system and authentication is the act of verifying the claimed identity of an individual, station or originator, and finally authorization is the granting of the right of access to a user, program, or process.

Prior art solutions to the problems of identification, authentication, confidentiality, authentication, integrity and non-repudiation in information systems have focused heavily on the applications of cryptography and/or so-called "Smart Cards". For confidentiality, encryption is used to scramble information sent between users so that eavesdroppers cannot understand the data's content. Authentication usually employs digital signatures to identify the author of a message such that the recipient of the message can verify the identity of the person who signed the message. Digital signatures can be used in conjunction with passwords, or as an alternative to them.

Message integrity, if considered, is typically determined by methods that verify that a message has not been modified, such as message digest codes. Non-repudiation describes the creation of cryptographic receipts so that an author of a message cannot falsely deny sending a message. Thus the Internet reveals the full complexity of trust relationships among people, computers, and organizations.

Today, the dominant approach to authentication by digital signatures uses public-key cryptographic techniques employing two related keys, a public key and a private key. In public-key cryptography, the public key is made available to anyone who wants to correspond with the owner of the corresponding private key. The public key can be used to verify a message signed with the private key or to encrypt messages that can only be decrypted using the private key. The secrecy of messages encrypted this way, and the authenticity of the messages signed this way, relies on the security of the private key. Thus, the private key is kept secret by the owner in order to protect the key against unauthorized use.

Traditionally "Smart Cards" have been used as signing tokens for authenticating a user, wherein "Smart Cards" is merely an alternative name for a microprocessor card, in that it refers to a card that is 'smart,' and is not to be confused with the registered trademark of Groupmark. "Smart Cards" place digital certificates, cryptographic keys and other information on a PIN-protected token carried by the end-user, which is more secure than storing it on a computer device which may be vulnerable to unauthorized access.

All the cryptographic algorithms involving the private key, such as digital signatures and key exchanges, are performed on the card. By signing transactions in such an environment, users are assured a modicum of integrity and privacy of the data that are exchanged between each other. The private key need not be revealed outside of the token. However, one of the disadvantages of "Smart Cards" is that the owner is not protected from abuse of the "Smart Card". For example, because of the lack of a user interface, such as a display screen, the owner may not be sure about the contents of the actual message being signed with the "Smart Card." Another drawback of "Smart Cards" is that any entity or person in possession of the "Smart Card" and the PIN, who may not be the rightful owner or which may be a malicious application, in effect has knowledge of the private key and can therefore exploit it.

Another approach that has been adopted is to eliminate the "Smart Card" and implement the solutions by means of a personalized device, such as a wireless application protocol (WAP) capable mobile phone or wireless personal digital assistant (PDA), the personalized devices then providing the signing token. Such a personalized device can store the private key and sign transactions on behalf of its owner. In such a situation, the holder of the personalized device is assumed to be its rightful owner or authorized representative as determined by an appropriate access-control mechanism. This approach being extended further by Vanstone in U.S. Pat. No. 7,216,237 ("System and Method for Trusted Communication") where a data message may be generated on an external device, such as a personal computer (PC), and then presented to the personalized device for signing. Vanstone teaches that the client may compare the message on the PC and personalized device prior to issuing the approval to append their electronic signature to the message and thereby complete, for example, the e-commerce transaction. Alternatively Vanstone teaches that all activities are contained within the personalized device, enabling wireless e-commerce transactions.

However, there exists substantial risk for fraud in either approach. In the first approach when the message is prepared on a PC and conveyed to the personalized device the integrity of the message may be compromised. This scenario occurring, for instance, when the client wishes to use the larger viewing area or speed of the PC to perform the browsing, item selection and transaction aggregation, prior to completing the transaction on the personalized device by signing. The signed data message is transmitted via the personalized device. The personalized device thus acts both as a signing token and as a transmitting device. In this situation, it is assumed that the external computer can be trusted and that this computer does not contain malicious software (malware) and/or has not been programmed by unscrupulous individuals to alter the content of the message. Should the data that are presented for signing on the personalized device contain different information from that which was displayed, the owner of the private key would then unknowingly sign fraudulent or financially harmful transactions. A common malware being the so-called "man-in-the-middle" attack (MITM) and incorporating phishing and substitution attacks. There is also the man-in-the-browser attack (MITB) which is even more likely to be able to steal and manipulate transactions without detection by the user.

In the second situation, wherein all activities are contained within the personalized device, one potential fraud arises when the personalized device operating system becomes corrupted, such as for instance by unintentionally installed software containing malicious code, script embedded in messages, or by compromise of the personalized device operating system via security holes. This type of malware can then alter the contents of transactions, as described above. Further, there is greater potential for fraud as transactions could be created, signed, and transmitted without the owner being aware that they are occurring. For the client it would be very difficult detect such fraud, as prima facie the personalized device's owner appears to have sanctioned the data message by appending a valid signature.

It would be beneficial to provide a system and method that overcomes at least some of the limitations of the prior art.

SUMMARY OF THE INVENTION

In accordance with an aspect of the invention there is provided a computer server comprising: a memory store for storing a plurality of branded watermarks; a suitably programmed processor for receiving transaction data, for selecting a first branded watermark from the plurality of branded watermarks, for producing first verification data comprising first data for verification and relating to the transaction and first watermark data relating to the first branded watermark for preventing tampering with the first data, and for providing second verification data comprising an indication of the selected first branded watermark; and, at least a transmitter for transmitting the first verification data to a destination system and for transmitting the second verification data to a second other destination system.

In accordance with an aspect of the invention there is provided a secure processing system comprising: a memory having stored therein indications for branded watermarks of a plurality of known branded watermarks; a processor for receiving second verification data and for determining based thereon an indication of a branded watermark; and, a display for displaying the indication to a user of the secure processing system.

In accordance with an aspect of the invention there is provided a method comprising: establishing a first communication path between a first system and a server; receiving from the first system data relating to a transaction for a known user; providing to the first system first verification data for verifying and authorizing the transaction, the first verification data comprising a branded watermark; establishing a second communication path between a second other system and the server, the second other system associated with the known user; and, providing to the second other system second verification data for use in providing an indication of the branded watermark.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications. Thus, the present invention is not intended to be limited to the embodiments disclosed, but is to be accorded the widest scope consistent with the principles and features disclosed herein.

Figure 1:
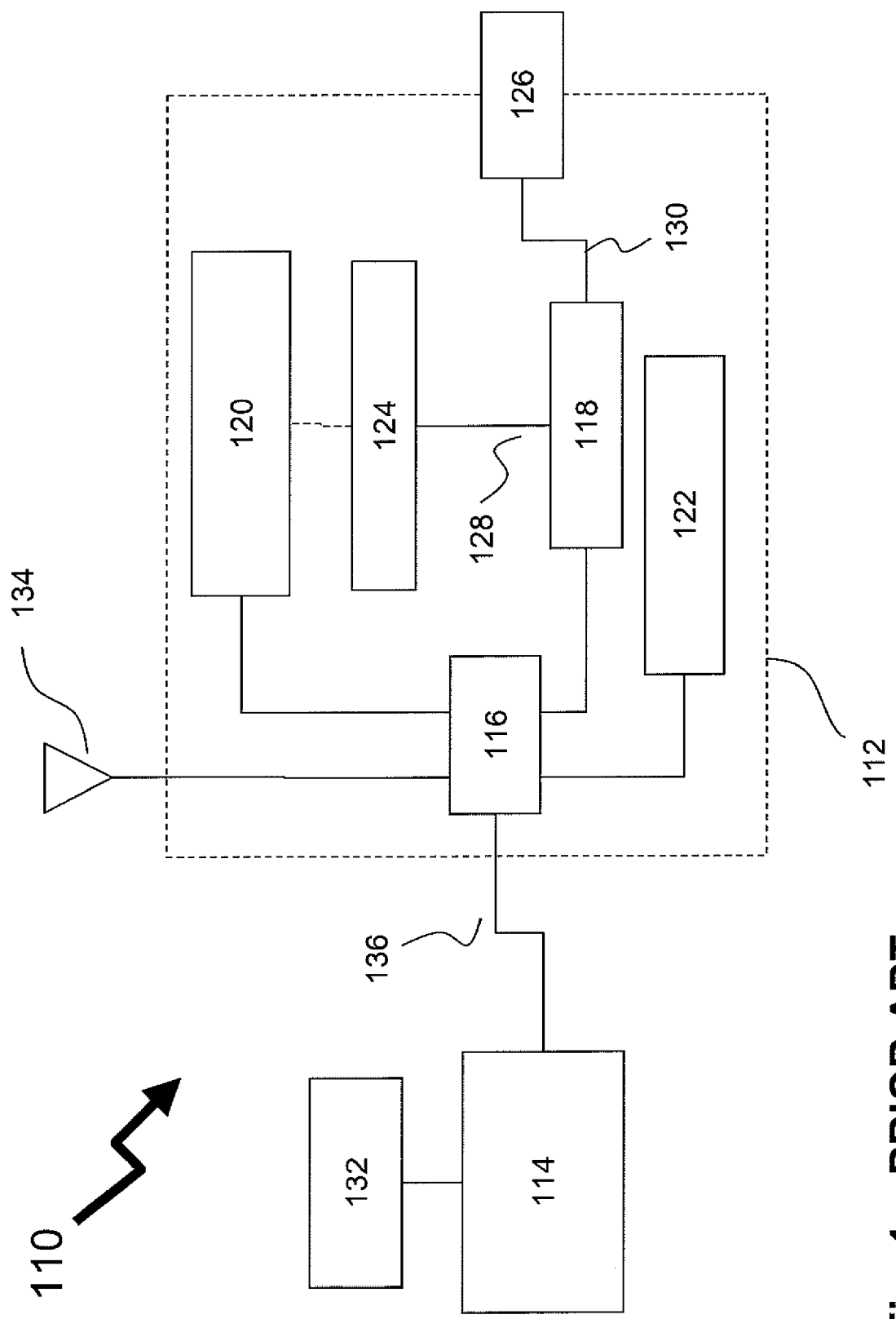
FIG. 1 illustrates a prior art approach to providing a trusted message for signature by a client.

FIG. 1 illustrates a prior art approach for providing a trusted message for signature by a client. In particular, FIG. 1 shows a system 110 for verifying the integrity of a data message between a first device 112 and a second device 114 that is in communication with the first device. The first device 112 is designated as a personalized device and the second device 114 is designated as a personal computer. For instance, the personalized device 112 is a mobile phone that is controlled by the device main processor 116 including a secure module 118. The secure module 118 is adapted to operate independently of the device main processor 116, so that the internal state of the secure module 118 cannot be readily reverse engineered and/or that its interactions with the underlying hardware are not easily intercepted and reinterpreted. Coupled to the device main processor 116 is a device display 120, which provides textual and graphical displays that prompt a user for input information. A keyboard 122 coupled to the device main processor 116 facilitates the input of information. Similarly, the secure module 118 is in communication with a secure display 124, and with a secure input device, preferably a trusted button 126.

The secure display 124 is wholly under the control of the secure module 118 and is coupled thereto by secure path 128, and the trusted button 126 is in direct communication with the secure module 118 via secure path 130. Thus, the secure paths 128 and 130 are logically isolated and distinct from any other paths. The secure module 118, the secure I/O devices 124 and 126, and the secure paths 128 and 130 form trusted paths between said secure module 118 and a user of the personalized device 112. The personal computer 114 may be a laptop computer, a PC, a workstation etc., and includes an external display 132. The data message for authentication is transmitted from the external computer 114 via a communication path 136 to the personalized device 112 and is then received by the message transceiver 134. The data message for authentication by the personalized device 112 is communicated from the personal computer 114 via communication path 136, or through a wireless interface via antenna 134. Thus, the personalized device 112 receives data, and is used to sign a data message generated on the personal computer 114. In operation, the personal computer 114 assembles the data comprising the portion of the data message to be signed, preferably displaying the appropriate data message on the external display 132, and conveys the data to the personalized device 112 via the path 136.

The device main processor 116 conveys the data to the secure module 118, optionally displaying the same data on the display 120. The secure module 118 displays the data message, or a portion of the message, on the secure display 124 in an appropriate format. In order to verify the integrity of the data, the user compares the data message on the external display 132 and the data message, or portion of it, on the secure display 124. If there is a match between the two data messages, the user actuates the trusted actuator in the form of trusted button 126 to instruct the secure module 118, specifically a signature generator process, to generate a signature.

In the system 110 the trusted path is established only between the personal computer 114 and personalized device 112, both of which belong to the same user. As such the trusted path exists only between the personal computer 114 and personalized device 112, and is used solely for the portion of the data message that is to be signed. As such the system that is shown in FIG. 1 does not protect the user from MITM or MITB attacks on the personal computer 114, which adjust or alter the contents of the data message such that the user is not aware of the content of the full message they are signing. The personal computer 114 is also not secured in its communications to the party from whom the message that is to be signed originates. This provides further opportunities in the overall communications for fraudulent transactions or extraction of the user's signature.

Figure 2:
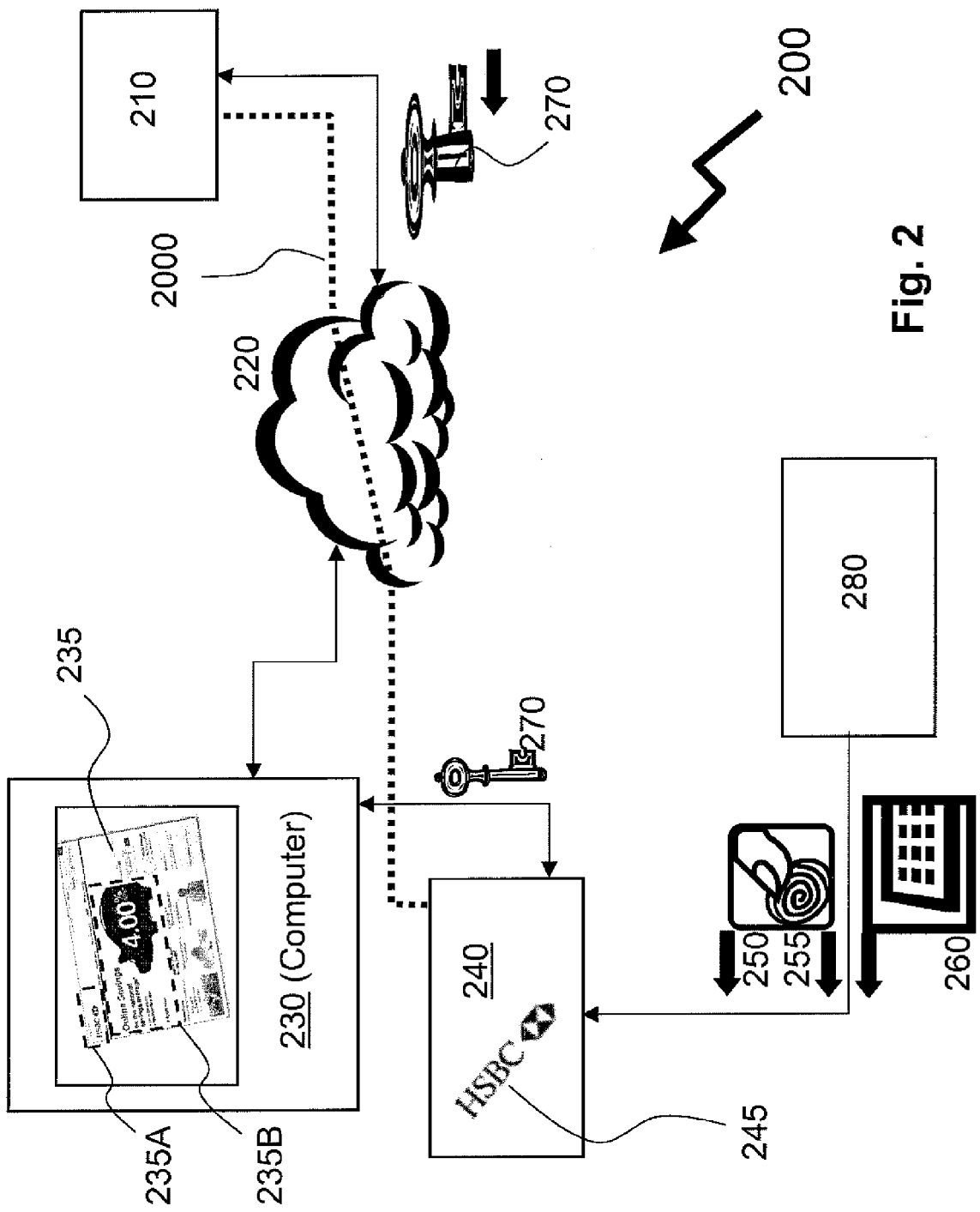
FIG. 2 illustrates an embodiment of the instant invention, wherein a trusted path is initially established between the transacting party and the client through the use of a secure demountable memory device; and, FIG. 3 illustrates an embodiment of the instant invention, wherein the trusted path is established with a personalized device of the client and the transaction primarily initiated upon the clients PC.

Referring now to FIG. 2, shown is transaction system 200 according to an embodiment of the instant invention and including a trusted path 2000 from a transactor 210 to a user 280. As such, user 280 wishing to perform at least one transaction with the transactor 210 initiates the establishment of a secure communications channel by connecting their security module 240 to their computer 230, and initiating a request to the transactor 210. Both the transactor 210 and computer 230 are interconnected via a network in the form of the World Wide Web (commonly referred to as Internet) 220. Upon receiving the request from the user 280, the transactor 210 issues a certificate 270 to the user 280, which is communicated via the Internet 220 to the computer 230 and thereupon to the user's security module 240.

The certificate 270 is a digital document issued by the transactor 210 attesting to the binding of a public key to the transactor 210, and allowing verification of the claim that the public key provided with the certificate 270 does in fact belong to the transactor 210. The certificate thereby prevents a third party from using a fraudulent public key to impersonate the transactor 210. In its simplest form, certificate 270 contains a public key and a name, although commonly it also contains an expiration date, the name of the certifying authority that issued the certificate, a serial number, and perhaps other information. In addition, the certificate 270 contains a digital signature of the certificate issuer. The most widely accepted format for certificates is defined by the ITU-T X.509 international standard.

The secure module 240 upon validating the certificate 270 requests that the user 280 provide verification of their identity. As shown in FIG. 2, the security module 240 requires the user 280 to provide both a fingerprint 250 and a password 260. The fingerprint 250 verifies the physical presence of the user 280 at the secure module 240, and the password 260 provides access to their transaction file established with the transactor 210. Upon validating both the fingerprint 250 and password 260, the security module 240 provides the transactor 210 with any key or password information necessary to complete the establishment of a trusted path 2000 between user's security module 240 and transactor 210. The user 280 now has access to transactions they wish to undertake upon their computer 230, wherein prior to completing a transaction the user 280 is requested to authorize their digital signature to complete the transaction. At this point the first validation request 235 is displayed on the user's computer 230 and on the user's security module 240 as second validation request 245. The user 280, upon determining that the first and second validation requests are correct and correlated, initiates issuance of their digital signature by providing authorization in the form of second fingerprint 255. As is evident from first validation request 235 the image displayed on the user's computer 230 includes an advertisement 235B relating to the online savings options provided by HSBC Bank, whose logo is also present on the user's computer 230 as logo 235A. As such, the second validation request 245 is the logo of HSBC Bank. More generally, the second validation request 245 is the logo of the advertiser providing the advertisement 235B onto the user's computer 230.

According to the system that is shown in FIG. 2, a trusted path 2000 is initially established between transactor 210 and the user's security module 240, optionally relying on user 280 input data in the form of fingerprint 260 and password 250. Subsequently, any transactions provide for advertising information presented to the user on the user's primary system of initiating the transaction, such as for instance computer 230, to be correlated with information provided by the transactor 210 to the user's security module 240. Examples of such information include but are not limited to a fixed advertisement, a video advertisement, an audio advertisement, a "jingle" or copyrighted/trademark sound mark, or otherwise identifiable data relating to a product, service, operation, event or aspect of business of a corporation, charity or other entity.

Of course, the user 280 is expected to be familiar with hundreds, if not thousands of images, sounds and products related to advertisers. Accordingly, in many instances the second verification request 245 provided to the user's security module 240 may optionally be substantially reduced in complexity, content, etc. with respect to the first verification request 235.

During a transaction, a document that is provided to the user's primary system (i.e., computer 230) is watermarked using a branded watermark, and an indication of said branded watermark is provided to the user via the security module 240. In particular, the branded watermark is based upon an advertisement, and is embedded within the transaction document. Verification of the branded watermark is performed based upon information provided via the trusted path 2000. For example, an image of the branded watermark is provided via the trusted path 2000 to the security module 240. Alternatively, the information provided on the user's security module 240 is an indication of the information provided by the transactor 210 and displayed to the user, such as on their computer 230. For example, the information provided on the user's security module 240 comprises "Your Bank," indicating that the information provided by the transactor should include a branded watermark of the user's bank, for example Chase Manhattan, HSBC, or Bank of America. In another example, the information comprises "Toyota 4%" indicating that the branded watermark is the rate of interest charged by Toyota in respect of vehicle leasing and included within the advertisement watermark provided to the user's computer 230. Such approaches make false digital signatures for fraudulent transactions avoidable, as every transaction is verified using a different one of a plurality of allowed branded watermarks.

Optionally, the branded watermarks are selected from a group of advertisements selected to represent those commonly presented to the user within their highlighted preferred media sources, such as online newspaper, preferred cable TV channels, etc. Alternatively, the branded watermarks are specifically related to the user in respect of their service providers, purchasing habits etc.

As will be apparent to the person having ordinary skill in the art, the use of branded watermarks in security applications provides additional opportunities to generate advertising revenue. In addition, since typically the user is exposed to a wide variety of logos and other advertising images, sounds, etc. as they go about their day, the user is expected to have a high degree of familiarity with the content of the branded watermarks. Accordingly, the amount of information that is sent to the user's security module 240 may be relatively small, provided it is sufficient to trigger in the user an association with a particular branded watermark.

Figure 3:
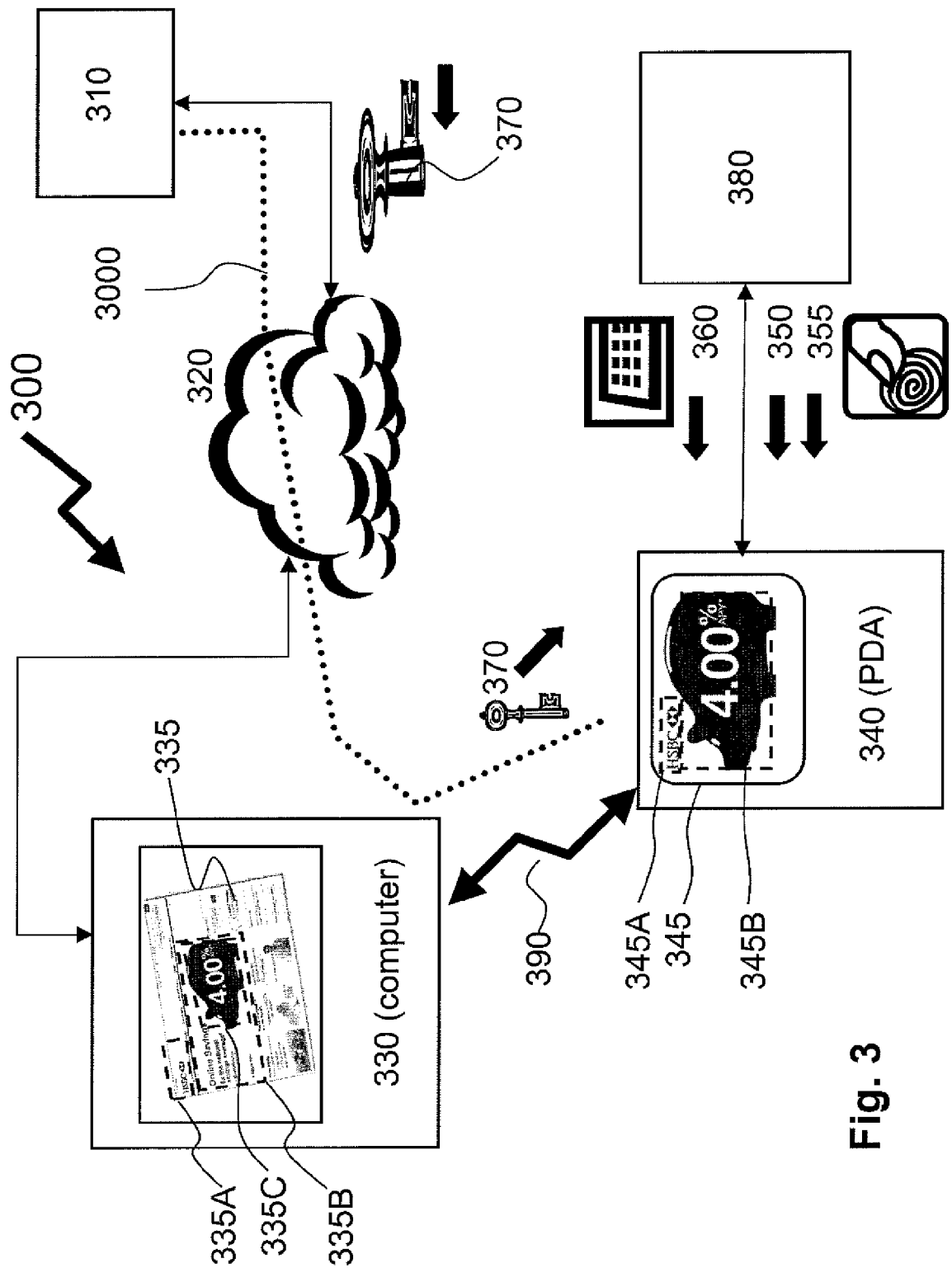

Referring now to FIG. 3, shown is transaction system 300 according to an embodiment of the instant invention, including a trusted path 3000 from transactor 310 to user 380. As such, user 380 wishing to perform at least one transaction with the transactor 310 initiates the establishment of a secure communications channel by connecting their personal digital assistant (PDA) 340 to their computer 330 via a peer-to-peer (P2P) link 390, and initiates a request to the transactor 310. Both the transactor 310 and computer 330 are interconnected via the World Wide Web (commonly referred to as Internet) 320. Optionally, PDA 340 is also interconnected via the Internet rather than by a P2P link 390. Upon receiving the request from the user 380, the transactor 310 issues a certificate 370 to the user 380, which is communicated via the Internet 320 to the computer 330 and thereupon via P2P link 390 to the PDA 340.

The certificate 370 comprises a digital document issued by the transactor 310 attesting to the binding of a public key to the transactor 310, and allowing verification of the claim that the public key provided with the certificate 370 does in fact belong to the transactor 310. The certificate thereby prevents a third party from using a fraudulent public key to impersonate the transactor 310.

The PDA 340 upon validating the certificate 370 requests that the user 380 provide verification of their identity. As shown, the PDA 340 prompts the user 380 to provide a first fingerprint 350 and a password 360, the first fingerprint 360 verifying the physical presence of the user 380 at the secure module 340, and the password 350 providing access to their transaction file established with the transactor 310. Upon validating both the first fingerprint 350 and the password 360, the security module 340 provides the transactor 310 with any key or password information necessary to complete the establishment of a trusted path 3000 between the user's PDA 340 and the transactor 310. The user 380 accesses the transactions they wish to undertake upon their computer 330, wherein prior to completing a transaction the user 380 is requested to provide their digital signature. At this point the first validation request 335 is displayed on the user's computer 330 and the second validation request 345 is provided at the user's PDA 340. The user 380 verifies the first validation request against the second validation request, and when the two are correlated the user 380 initiates issuance of their digital signature, for example by providing second fingerprint 355.

As is evident from first validation request 335 the image displayed on the user's computer 330 includes an advertisement 335B relating to the online savings options provided by HSBC Bank, whose logo is also present on the user's computer 330 as logo 335A. Also contained within the first validation request 335 is an image 335C, in this case a red pig moneybox. As such the second validation request 345 comprises two elements, the first being the logo of HSBC Bank 345A, mirroring the logo of the advertiser providing the advertisement 335B onto the user's computer 330, and hence the logo 335A. The second element 345B of the second validation request 345 comprises an element of the advertisement 335B provided within the first validation request 335, namely the red pig money box mirroring the image 335C.

Further, as discussed supra in respect of FIG. 2 the information that is provided on the user's security module 340 is only an indication of the information provided by the transactor and displayed to the user, such as on their computer 330. Accordingly, the security module 340 does not require the same display capabilities as the computer 330. For example, the information provided on the user's security module 340 is optionally in black and white whilst the image on the computer 330 is in color. As such the security module is manufacturable at low cost with increased simplicity. Such approaches render false generation of potential transactions more difficult as every transaction optionally includes any of a plurality of branded watermarks for that individual or organization. Alternatively, the watermarks are generic to the system. Further, the information relating to the transactor is optionally periodically revised and communicated to the user's security module 340 during other activities, not necessarily associated with a transaction, or provided when they physically visit an office associated with the transactor. Of course, providing a visual display presenting the advertisement based verification provides the most flexibility since each document may then be modified with an advertisement to provide a different unique image.

Numerous other embodiments may be envisaged without departing from the spirit or scope of the invention.

What is claimed is:

1. A method comprising:
   selecting, by a transactor server, a watermark from a group of advertisements, wherein the watermark is an advertisement;
   generating a watermarked document by embedding, by the transactor server, the watermark in a document;
   transmitting, by the transactor server, the watermarked document in a first validation request to a user computer;
   displaying, by the user computer, the first validation request;
   embedding into a second validation request, by the transactor server, an indication of the advertisement that is embedded in the watermarked document;
   transmitting, by the transactor server, the second validation request to the secure module;
   displaying, by the secure module, the second validation request;
   prior to completing a transaction, requesting, by the user computer, a digital signature;
   in response to the digital signature request and the displaying of the first and second validation requests receiving, by the secure module, a fingerprint; and
   completing, by the secure module, the transaction by authorizing a digital signature based on the received fingerprint.

2. A method according to claim 1 wherein at least some of the data is transmitted via a secure communication path.

3. A method according to claim 1 wherein the indication comprises an index indicative of the watermark selected from the group of advertisements.

4. A method according to claim 1 wherein the advertisement comprises first image data and wherein displaying the first validation request comprises providing, by the user computer, the first image data in human intelligible form.

5. A method according to claim 4 wherein the indication of the advertisement comprises second image data and wherein displaying the second validation request comprises providing, by the secure module, the second image data in human intelligible form.

6. A method according to claim 1 wherein the advertisement comprises first audio data and wherein displaying the first validation request comprises providing, by the user computer, the first audio data in human intelligible form.

7. A method according to claim 6 wherein the indication of the advertisement comprises second audio data and wherein displaying the second validation request comprises providing, by the secure module, the second audio data in human intelligible form.

8. A method according to claim 1 wherein the first validation request comprises a time signature, the time signature for use in detecting delays, the delays potentially indicative of tampering.

9. A method according to claim 1 wherein the second validation request comprises data for use by a known user of the secure module in determining a content of the advertisement, the data other than a direct indication of the advertisement.

10. A computer implemented system comprising:
a transactor server comprising a processor and
a memory, the memory having stored thereon computer executable instructions, which when executed by the transactor server cause the transactor server to perform the steps of:
   selecting a watermark from a group of advertisements, wherein the watermark is an advertisement;
   generating a watermarked document by embedding the watermark in a document;
   transmitting the watermarked document in a first validation request to a user computer;
   embedding into a second validation request an indication of the advertisement that is embedded in the watermarked document; and,
   transmitting the second validation request to a secure module;
a user computer comprising a processor and a memory, the memory having stored thereon computer executable instructions, which when executed by the user computer cause the user computer to perform the steps of:
   displaying the first validation request and
   prior to completing a transaction, requesting a digital signature;
a secure module comprising a processor and a memory, the memory having stored thereon computer executable instructions, which when executed by the secure module cause the secure module to perform the steps of:
   displaying the second validation request;
   in response to the digital signature request and the displaying of the first and second validation requests receiving a fingerprint; and
   completing the transaction by authorizing a digital signature based on the received fingerprint.

* * * * *